United States Patent

Umetsu et al.

[11] Patent Number: 5,804,634
[45] Date of Patent: Sep. 8, 1998

[54] LIQUID CRYSTALLINE RESIN COMPOUND AND MOLDINGS THEREOF

[75] Inventors: Hideyuki Umetsu; Kiyokazu Nakamura; Toshihide Inoue; Miki Sakai; Toshio Kurematsu, all of Aichi, Japan

[73] Assignee: Toray Industries, Inc., Japan

[21] Appl. No.: 763,071

[22] Filed: Dec. 10, 1996

[30] Foreign Application Priority Data

Dec. 15, 1995 [JP] Japan ................................. 7-327370
Mar. 11, 1996 [JP] Japan ................................. 8-052938

[51] Int. Cl.⁶ .......................... C08K 5/03; C08K 3/34; C08K 20/00
[52] U.S. Cl. .................. 524/466; 524/493; 524/601; 524/604; 524/605; 525/444
[58] Field of Search .................. 524/466, 493, 524/601, 604, 605; 525/444

[56] References Cited

U.S. PATENT DOCUMENTS

| | | | |
|---|---|---|---|
| 4,803,235 | 2/1989 | Okada | 524/494 |
| 4,889,886 | 12/1989 | Wada et al. | 524/449 |
| 5,085,807 | 2/1992 | Okamoto et al. | 428/1 |
| 5,112,913 | 5/1992 | Horiuchi et al. | 525/133 |
| 5,221,705 | 6/1993 | Inoue et al. | 524/466 |
| 5,324,795 | 6/1994 | Suenagan et al. | 525/444 |
| 5,418,281 | 5/1995 | Yung et al. | 524/602 |
| 5,492,946 | 2/1996 | Husperi et al. | 524/494 |

FOREIGN PATENT DOCUMENTS

| | | |
|---|---|---|
| 0264290B1 | 4/1988 | European Pat. Off. . |
| 2167513 | 5/1986 | United Kingdom . |

*Primary Examiner*—Tae Yoon
*Attorney, Agent, or Firm*—Austin R. Miller

[57] ABSTRACT

Disclosed herein is a liquid crystalline resin compound which includes about 100 pbw of liquid crystalline resin and about 5–200 pbw of inorganic filler, the liquid crystalline resin being composed of about 99.5-50 wt % of partially aromatic liquid crystalline polyester resin and about 0.5–50 wt % of wholly aromatic liquid crystalline polyester resin, and the inorganic filler having an average aspect ratio in the range of 3 to 25. Also disclosed is a molded article of liquid crystalline resin obtained by molding from the liquid crystalline resin compound. The resin compound is superior in flowability and the molded article has good mechanical properties, especially balanced rigidity and toughness.

22 Claims, No Drawings

LIQUID CRYSTALLINE RESIN COMPOUND AND MOLDINGS THEREOF

BACKGROUND OF THE INVENTION

1. Field of the Invention

The present invention relates to a liquid crystalline resin compound and moldings thereof which are characterized by improved flowability and mechanical properties, especially rigidity and toughness.

2. Description of the Prior Art

To meet ever-increasing requirements for high-performance plastics, there have recently been developed and put on the market a number of new plastics having unique characteristic properties. Among them is the optically anisotropic liquid crystalline polymer characterized by the parallel arrangement of molecular chains. It attracts attention because of its excellent flowability and mechanical properties and it finds use as thin moldings (such as a housing) in the fields of electric and electronic machines and office machines on account of its high rigidity.

The liquid crystalline polymers exemplified below are known for their ability to form anisotropic molten phases.

Copolymer of p-hydroxybenzoic acid and polyethylene terephthalate (disclosed in Japanese Patent Laid-open No. 72393/1974).

Copolymer of p-hydroxybenzoic acid and 6-hydroxy-2-naphthoic acid (disclosed in Japanese Patent Laid-open No. 77691/1979).

Copolymer of p-hydroxybenzoic acid, 4,4'-dihydroxybiphenyl, terephthalic acid, and isophthalic acid (disclosed in Japanese Patent Publication No. 24407/1982).

These liquid crystalline polymers, however, have the disadvantage of varying in molding shrinkage and mechanical properties depending on directions parallel or perpendicular to the orientation of molecular chains. Therefore, they are usually incorporated with a filler (such as glass fiber) so as to eliminate their anisotropy of mechanical properties and molding dimensions.

It is known that a blend of two liquid crystalline polymers differing in molecular structure has improved characteristic properties (as disclosed in Japanese Patent Laid-open Nos. 40550/1982, 220556/1987, 132967/1988, 88667/1990, and 145643/1990). Although the resulting blend exhibits a higher elastic modulus than the single polymer, the simple blending of two polymers is not of practical use because of marked anisotropy. Reduction of anisotropy by incorporation with glass fiber is disclosed in Japanese Patent Publication Nos. 173157/1990, 95260/1991, and 54250/1991. It turned out that glass fiber destroys the morphology resulting from the two polymers, thereby reducing anisotropy, but does not contribute much to mechanical properties.

SUMMARY OF THE INVENTION

It is an object of the invention to provide a liquid crystalline resin compound composed of a liquid crystalline polymer and a filler with a specific aspect ratio incorporated thereinto, the resin compound having improved flowability and mechanical properties, especially balanced rigidity and toughness, and reduced anisotropy on account of the filler which forms a particular morphology.

A first aspect of the invention resides in a liquid crystalline resin compound which comprises about 100 pbw (i.e., parts by weight) of liquid crystalline resin and about 5–200 pbw of inorganic filler, the liquid crystalline resin being composed of about 99.5-50 wt % of partially aromatic liquid crystalline polyester resin and about 0.5–50 wt % of wholly aromatic liquid crystalline polyester resin, based on the weight of the liquid crystalline resin, and the inorganic filler having an average aspect ratio in the range of about 3 to 25.

A second aspect of the invention resides in a liquid crystalline resin compound which comprises about 100 pbw of liquid crystalline resin and about 5–200 pbw of inorganic filler, the liquid crystalline resin being composed of about 95-55 wt % of partially aromatic liquid crystalline polyester resin and about 5–45 wt % of wholly aromatic liquid crystalline polyester resin, based on the weight of the liquid crystalline resin, and the inorganic filler having an average aspect ratio in the range of about 3 to 25.

A third aspect of the invention resides in a molded article of liquid crystalline resin obtained by molding from the liquid crystalline resin compound.

DESCRIPTION OF THE PREFERRED EMBODIMENTS

The resin compound of the invention contains as a constituent a partially aromatic liquid crystalline polyester resin which has aliphatic chains such as ethylene, trimethylene, tetramethylene and cyclohexane dimethylene in the molecular chain and forms the anisotropic molten phase. This polyester resin should preferably contain an ethylene dioxy group in the molecular chain, and should more preferably be a copolymer composed of all of the following structural units (I), (II), (III), and (IV).

  (I)

  (II)

  (III)

  (IV)

where $R_1$ denotes one or more than one group selected from

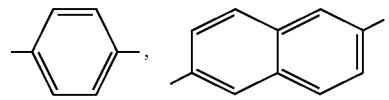

$R_2$ denotes one or more than one group selected from

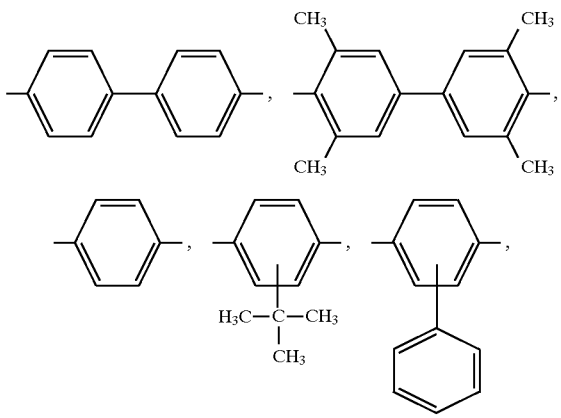

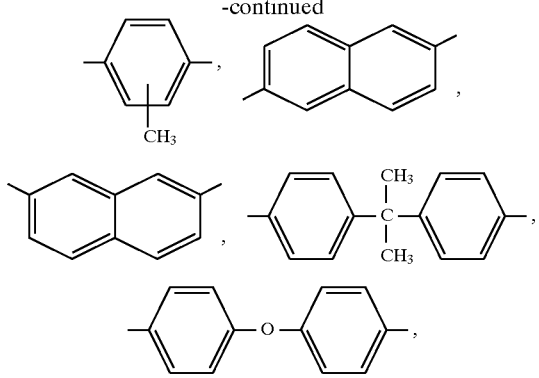

$R_3$ denotes one or more than one group selected from

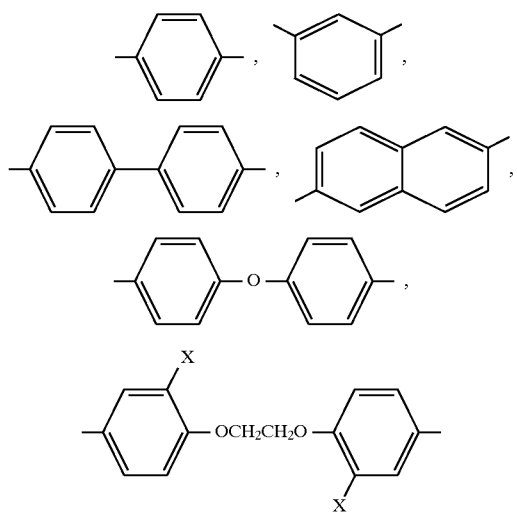

where x denotes hydrogen or chlorine, and the total amount of the structural units (II) and (III) is substantially equimolar with the amount of the structural unit (IV).

Structural unit (I) is formed from p-hydroxybenzoic acid or 2,6-naphthalenedicarboxylic acid; structural unit (II) is formed from an aromatic dihydroxy compound selected from 4,4'-dihydroxybiphenyl, 3,3',5,5'-tetramethyl-4,4'-dihydroxybiphenyl, hydroquinone, t-butylhydroquinone, phenylhydroquinone, methylhydroquinone, 2,6-dihydroxynaphthalene, 2,7-dihydroxynaphthalene, 2,2-bis(4-hydroxyphenyl)propane, and 4,4'-dihydroxydiphenyl ether; structural unit (III) is formed from ethylene glycol; and structural unit (IV) is formed from an aromatic dicarboxylic acid selected from terephthalic acid, isophthalic acid, 4,4'-diphenyldicarboxylic acid, 2,6-naphthalenedicarboxylic acid, 4,4'-diphenyl ether dicarboxylic acid, 1,2-bis(phenoxy)ethane-4,4'-dicarboxylic acid, and 1,2-bis(2-chlorophenoxy)ethane-4,4'-dicarboxylic acid.

Preferable among these structural units are (II) and (IV) in which $R_2$ is

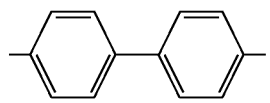

and $R_3$ is

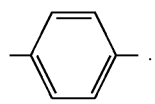

The partially aromatic liquid crystalline polyester resin should preferably be a copolymer composed of the above-mentioned structural units (I), (III), and (IV) and/or a copolymer composed of the above-mentioned structural units (I), (II), (III), and (IV). Although these structural units may be contained in any ratio, it is desirable that the total amount of (I) and (II) be about 60–95 mol %, preferably about 75–93 mol %, of the total amount of (I), (II), and (III). It is also desirable that the amount of (III) be about 40-5 mol %, preferably about 25-7 mol %, of the total amount of (I), (II), and (III). It is desirable that the molar ratio of (I)/(II) be in the range of about 75/25 to 95/5, preferably about 78/22 to 93/7, from the standpoint of balance between heat resistance and flowability. The amount of (IV) should be substantially equimolar with the total amount of (II) and (III).

The partially aromatic liquid crystalline polyester resin is characterized by its weight-average molecular weight in the range of about 10,000–200,000, preferably about 11,000–150,000, and most desirably about 12,000–100,000 from the standpoint of mechanical strength, moldability, and flowability. The molecular weight may be determined by gel permeation chromatography, infrared spectrophotometry (as a standard method that needs no polymer solutions but employs a compression-molded film for analysis of terminal groups), or light scattering method (applicable to a solution in pentafluorophenol). Their selection depends on the properties of the polymer to be analyzed.

The wholly aromatic liquid crystalline polyester resin should be one which forms the anisotropic molten phase when melted. It should preferably be composed of a copolymer having structural unit (I) and/or structural units (I), (II), and (IV).

Structural unit (I) is one which forms from a hydroxy aromatic carboxylic acid selected from p-hydroxybenzoic acid and 2,6-hydroxynaphthoic acid. Structural unit (II) is one which forms from more than one aromatic dihydroxy compound selected from 4,4'-dihydroxybiphenyl, 3,3',5,5'-tetramethyl-4,4'-dihydroxybiphenyl, hydroquinone, t-butylhydroquinone, phenylhydroquinone, methylhydroquinone, 2,6-dihydroxynaphthalene, 2,7-dihydroxynaphthalene, 2,2-bis(4-hydroxyphenyl)propane, and 4,4'-dihydroxydiphenyl ether. Structural unit (IV) is one which forms from more than one aromatic dicarboxylic acid selected from terephthalic acid, isophthalic acid, 4,4'-diphenyldicarboxylic acid, 2,6-naphthalenedicarboxylic acid, 4,4'-diphenyl ether dicarboxylic acid, 1,2-bis(phenoxy)ethane-4,4'-dicarboxylic acid, and 1,2-bis(2-chlorophenoxy)ethane-4,4'-dicarboxylic acid.

In the case of a copolymer composed of structural units (I), (II), and (IV), it is necessary, from the standpoint of flowability, that the amount of structural unit (I) be about 15–90 mol %, preferably about 40–90 mol %, of the total amount of structural units (I) and (II) and that the amount of structural unit (IV) be substantially equimolar with the amount of structural unit (II). A copolymer in which about 5–100 mol % of structural unit (IV) is accounted for by structural unit (V) shown below is particularly preferable.

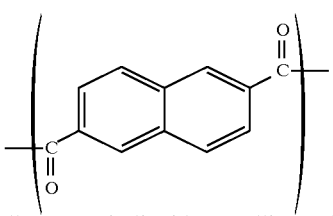

The wholly aromatic liquid crystalline polyester resin is characterized by its weight-average molecular weight in the range of about 10,000–200,000, preferably about 12,000–150,000, and most desirably about 15,000–100,000 from the standpoint of mechanical strength and flowability. The molecular weight may be determined by gel permeation chromatography, infrared spectrophotometry (as a standard method that needs no polymer solutions but employs a compression-molded film for analysis of terminal groups), or light scattering method (applicable to a solution in pentafluorophenol). Their selection depends on the properties of the polymer to be analyzed.

The liquid crystalline resin composition exhibits its unique properties only when its base material is a liquid crystalline resin composed of a combination of a partially aromatic liquid crystalline polyester resins and when a wholly aromatic liquid crystalline polyester resin and the base material is incorporated with a filler having a specific aspect ratio.

In production of the liquid crystalline resin by polycondensation, the above-mentioned constituents may be copolymerized with the following comonomers.

Aromatic dicarboxylic acid such as 3,3'-diphenyldicarboxylic acid and 2,2'-diphenyldicarboxylic acid.

Aliphatic dicarboxylic acid such as adipic acid, azelaic acid, sebacic acid, and dodecanedioic acid.

Alicyclic dicarboxylic acid such as hexahydroterephthalic acid.

Aromatic diol such as chlorohydroquinone, 4,4'-dihydroxydiphenylsulfone, 4,4'-dihydroxybenzophenone, and 3,4'-dihydroxybiphenyl.

Aliphatic and alicyclic diols such as 1,4-butanediol, 1,6-hexanediol, neopentylglycol, 1,4-hexanediol, and 1,4-cyclohexanedimethanol.

Aromatic hydroxycarboxylic acid such as m-hydroxybenzoic acid.

Other compounds such as p-aminophenol and p-aminobenzoic acid.

These comonomers should be used in a small amount not harmful to the object of the invention.

The liquid crystalline resin may be produced by polycondensation commonly used for liquid crystalline polyester resins. Five typical production methods are enumerated below as examples. The first to fourth ones are suitable for the wholly aromatic liquid crystalline polyester resin, and the fifth one is suitable for the partially aromatic liquid crystalline polyester resin.

(1) Production by polycondensation (with elimination of acetic acid) from p-acetoxybenzoic acid, diacylated aromatic dihydroxy compound (such as 4,4'-diacetoxybiphenyl and diacetoxybenzene), and aromatic dicarboxylic acid (such as 2,6-naphthalenedicarboxylic acid, terephthalic acid, and isophthalic acid).

(2) Production by polycondensation (with elimination of acetic acid) from p-hydroxybenzoic acid, aromatic dihydroxy compound (such as 4,4'-dihydroxybiphenyl and hydroquinone), and aromatic dicarboxylic acid (such as 2,6-naphthalenedicarboxylic acid, terephthalic acid, and isophthalic acid), with their phenolic hydroxyl groups acylated by reaction with acetic anhydride.

(3) Production by polycondensation (with elimination of phenol) from a phenyl ester of p-hydroxybenzoic acid and a diphenyl ester of an aromatic dihydroxy compound (such as 4,4'-dihydroxybiphenyl and hydroquinone) and an aromatic dicarboxylic acid (such as 2,6-naphthalenedicarboxylic acid, terephthalic acid, and isophthalic acid).

(4) Production by polycondensation (with elimination of phenol) from diphenyl esters and aromatic dihydroxy compounds, said diphenyl esters being formed from p-hydroxy-benzoic acid and aromatic dicarboxylic acid (such as 2,6-naphthalenedicarboxylic acid, terephthalic acid, and isophthalic acid) by reaction with diphenyl carbonate in a prescribed amount, and said aromatic dihydroxy compounds including 4,4'-dihydroxybiphenyl and hydroquinone.

(5) Production by method (1) or (2) in the presence of an ester polymer or oligomer (such as polyethylene terephthalate) or a bis(β-hydroxyethyl)ester of aromatic dicarboxylic acid (such as bis(β-hydroxyethyl) terephthalate).

The above-mentioned polycondensation reactions proceed in the absence of a catalyst; however, they may be catalyzed by a metal compound (such as stannous acetate, tetrabutyl titanium, potassium acetate, sodium acetate, and antimony trioxide) or metallic magnesium.

The partially aromatic liquid crystalline polyester resin and wholly aromatic liquid crystalline polyester resin may be specified by their logarithmic viscosity numbers measured at 60° C. on solutions of pentafluorophenol at a concentration of 0.1 g/dl. The former should have values ranging from about 0.5 to 15.0 dl/g, preferably from about 1.0 to 3.0 dl/g, and the latter should have values ranging from about 1.0 to 15.0 dl/g, preferably from about 2.5 to 10.0 dl/g.

The partially aromatic liquid crystalline polyester resin and wholly aromatic liquid crystalline polyester resin should be used respectively in a ratio ranging from about 99.5/0.5 to 50/50 wt %, preferably from about 95/5 to 55/45 wt %, most desirably from about 90/10 to 60/40 wt %. They will not produce their unique properties, if the amount of the latter relative to the former is less than about 0.5 wt % or more than about 50 wt % (in which case the resin compound is poor in flowability and rigidity).

The resin compound contains a filler in the form of fiber, powder, particle, or plate. Examples of the fibrous filler include glass fiber, carbon fiber, aromatic polyamide fiber, potassium titanate fiber, gypsum fiber, aluminum borate fiber, brass fiber, stainless steel fiber, steel fiber, ceramics fiber, boron whisker fiber, and asbestos fiber. The first three examples are preferable, and glass fiber is most desirable. Glass fiber of any type (such as long fiber, short fiber, chopped strand, and milled fiber) for resin reinforcement is acceptable. Examples of other fillers include mica, talc, silica, calcium carbonate, calcium oxide, aluminum oxide, glass beads, glass flake, glass microballoon, bentonite, clay, wollastonite, titanium oxide, barium oxide, zinc oxide, and graphite. Prior to their use, the above-mentioned fillers may be coated or treated with an epoxy polymer, urethane polymer, or acrylic polymer as a binder or sizing agent. The first one is particularly preferable. Two or more fillers may be used in combination with one another. In this case, it is desirable that a fibrous filler account for more than about 50%, especially glass fiber account for more than about 50%.

The filler in the resin compound should be one which has an average aspect ratio of about 3–25, preferably about 5–25, and most desirably about 5–20. A filler with an aspect ratio greater than 25 contributes to rigidity but not to toughness. A filler with an aspect ratio smaller than about 3 does not contribute to rigidity and reduction of anisotropy.

The filler should be used in an amount of about 5–200 pbw, preferably about 10–150 pbw, for the total amount (about 100 pbw) of the partially aromatic liquid crystalline polyester resin and wholly aromatic liquid crystalline polyester resin. With an amount in excess of about 200 pbw, the filler will have an adverse effect on the mechanical properties and flowability of the resin compound.

In the case where the filler is in the form of fibers, the weight mean fiber length should be shorter than about 0.3 mm, preferably shorter than about 0.20 mm, and most desirably shorter than about 0.15 mm, from the standpoint of balanced rigidity and toughness, and the fiber diameter should be in the range of about 5–15 μm, preferably about 6–13 μm.

In the case of particulate filler, the particle diameter should be smaller than about 100 μm, preferably smaller than about 20 μm, and most desirably smaller than about 15 μm, from the standpoint of toughness.

The fibrous filler may be measured for average aspect ratio, weight mean fiber length, and average fiber diameter in the following manner. A sample (about 5 g) of the resin compound is reduced to ash in a crucible and the remaining filler (100 mg) is taken and dispersed into 100 cc of soapy water. A few drops of the dispersion are placed on a slide glass using a dropping pipet for microphotographing. The microphotograph is examined for measurements of fiber length and fiber diameter. Measurements should be repeated for more than 500 specimens. The average aspect ratio is calculated by dividing the weight mean fiber length by the average fiber diameter.

The platy filler and particulate (or powdery) filler may be measured for average aspect ratio, average major axis, and average thickness in the following manner. A sample (about 5 g) of the resin compound is ashed in a crucible and the remaining filler (100 mg) is taken and dispersed into 100 cc of soapy water. A few drops of the dispersion are placed on a slide glass using a dropping pipet for microphotographing. The microphotograph is examined for measurements of major axis. The filler remaining after ashing is also observed and photographed under a scanning electron microscope. The electron micrograph is examined for measurements of thickness. Measurements should be repeated for more than 500 specimens and the average major axis (or length of the longest part of the filler) and the average thickness are obtained. The average aspect ratio is expressed in terms of the ratio between the average major axis and the average thickness.

In the case where more than one filler is used in combination, the average aspect ratio is expressed in terms of weighted mean of the average aspect ratios of the individual fillers.

The filler used in the present invention may be given a surface treatment with a silane coupling agent (such as aminosilane and epoxysilane) or titanate coupling agent for improvement in mechanical properties. An epoxysilane coupling agent is preferable.

The resin compound may be incorporated with an organic bromine compound (preferably containing more than about 20 wt % of bromine) as a flame retardant, which is exemplified below.

Low-molecular weight organic bromine compound such as hexabromobenzene, pentabromobenzene, hexabromobiphenyl, decabromobiphenyl, hexabromocyclodecane, decabromodiphenyl ether, (pentabromophenoxy)ethane, ethylene-bis (tetrabromophthalimide), and tetrabromobisphenol A.

Brominated polycarbonate (such as a polycarbonate oligomer produced from brominated bisphenol A or a copolymer thereof with bisphenol A).

Brominated epoxy compound (such as a diepoxy compound obtained by reaction between brominated bisphenol A and epichlorohydrin and an epoxy compound obtained by reaction between a brominated phenol and epichlorohydrin).

Brominated polymers and oligomers (such as poly (brominated benzyl acrylate), brominated polyphenylene ether, brominated bisphenol A, condensate of brominated phenol and cyanuric chloride, brominated polystyrene, crosslinked brominated polystyrene, and crosslinked brominated poly-α-methylstyrene), and mixtures thereof.

Preferable among these examples are ethylene bis(tetrabromophthalimide), brominated epoxy oligomer or polymer, brominated polystyrene, crosslinked brominated polystyrene, brominated polyphenylene ether, and brominated polycarbonate. Brominated polystyrene is most desirable.

A preferred example of the brominated epoxy polymer is represented by the formula (i) below.

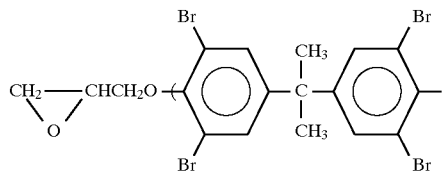 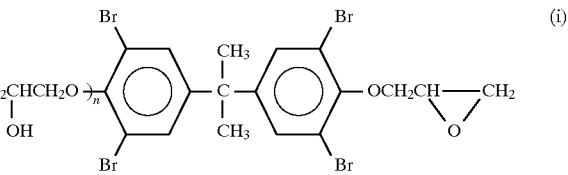

(where n denotes the degree of polymerization which should be greater than about 15, preferably in the range of about 50 to 80.)

The brominated polystyrene (with or without crosslinking) may be obtained by brominating polystyrene resulting from radical polymerization or anionic polymerization. Alternatively, it may be obtained from brominated styrene monomer by radical polymerization or anionic polymerization. A preferred brominated polystyrene is one which is produced by radical polymerization and has the brominated styrene units, as the major constituents, represented by the formula (ii) and/or the formula (iii) below. It should preferably have a weight-average molecular weight in the range of about $1 \times 10^3$ to $120 \times 10^4$.

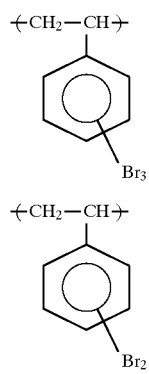

The brominated styrene monomer should preferably be one which has 2 or 3 bromine atoms introduced (by substitution) into the aromatic ring of each styrene monomer. It may also include one which has only 1 bromine atom.

The content of di- and/or tri-brominated styrene monomer in the brominated polystyrene should be more than about 60 wt %, preferably more than about 70 wt %, and the content of monobrominated styrene monomer (copolymerized with di- and/or tri-brominated styrene monomer) should be less than about 40 wt %, preferably about 30 wt %. The brominated polystyrene should preferably have a weight-average molecular weight in the range of about $1\times10^4$ to $15\times10^4$ (which is measured by gel permeation gel chromatography and is based on the molecular weight of polystyrene).

The brominated polystyrene with crosslinking may be obtained by brominating porous polystyrene crosslinked with divinylbenzene.

A preferred example of the brominated polycarbonate is represented by the formula (iv) below.

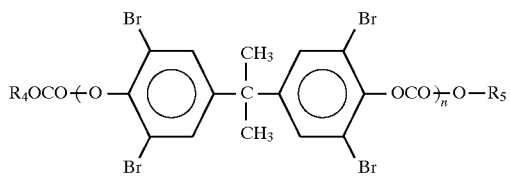

(where $R_4$ and $R_5$ each denote p-t-butylphenyl group or any other aryl group with or without substituents, and n denotes the degree of polymerization which is greater than 4, preferably greater than 8, and most desirably in the range of about 8 to 25).

The content of the organic bromine compound should be about 0.5–60 pbw, preferably about 1–30 pbw, for 100 pbw of the liquid crystalline resin.

The organic bromine compound in the liquid crystalline resin compound of the present invention should be dispersed in the form of fine particles having an average diameter smaller than about 25 μm, preferably smaller than about 2.0 μm.

The liquid crystalline resin compound may optionally be incorporated with at least one olefin polymer which is selected from polyethylene, polypropylene, copolymers of ethylene with an α-olefin having 3 or more carbon atoms, copolymers of propylene with an α-olefin having 4 or more carbon atoms, and copolymers of ethylene with an α-olefin having 3 or more carbon atoms and a non-conjugated diene.

Preferred examples of the α-olefin having 3 or more carbon atoms include propylene, butene-1, pentene-1, 3-methylpentene-1, and octacene-1. Of these examples, propylene and butene-1 are preferable, and they may be used in combination with one another.

Preferred examples of the α-olefin having 4 or more carbon atoms include those mentioned above (excluding propylene). They may be used in combination with one another.

Preferred examples of the non-conjugated dienes include 5-ethylidene-2-norbornene, dicyclopentadiene, and 1,4-hexadiene.

In the case of copolymers of ethylene with an α-olefin having 3 or more carbon atoms, the molar ratio of ethylene to α-olefin is usually from about 40/60 to 99/1, preferably from about 70/30 to 95/5.

In the case of copolymers of ethylene with an α-olefin having 3 or more carbon atoms and a non-conjugated diene, the amount of ethylene is usually about 5–96.9 mol %, preferably about 30–84.5 mol %, the amount of α-olefin is usually about 3–80 mol %, preferably about 15–60 mol %, and the amount of non-conjugated diene is usually about 0.1–15 mol %, preferably about 0.5–10 mol %.

In the case of copolymers of propylene with an α-olefin having 4 or more carbon atoms and a non-conjugated diene, the amount of propylene is usually about 5–96.9 mol %, preferably about 30–84.5 mol %, the amount of α-olefin is usually about 3–80 mol %, preferably about 15–60 mol %, and the amount of non-conjugated diene is usually about 0.1–15 mol %, preferably about 0.5–10 mol %.

Examples of these copolymers include ethylene/propylene copolymers, ethylene/butene-1 copolymers, ethylene/pentene-1 copolymers, ethylene/propylene/butene-1 copolymers, propylene/pentene-1 copolymers, propylene/butene-1 copolymers, ethylene/propylene/5-ethylidene-2-norbornene copolymers, ethylene/propylene/1,4-hexadiene copolymers, propylene/butene-1/1,4-hexadiene copolymers, and ethylene/propylene/dicyclopentadiene copolymers. Of these examples, ethylene/propylene copolymers and ethylene/butene-1 copolymers are desirable because of their good heat resistance.

The above-mentioned olefin polymers may be used in combination with one another.

It is desirable that the comonomer for the olefin copolymers be free of epoxy groups, carboxylic acid groups, etc. which have adverse effects on the flowability of the resin compound.

The above-mentioned olefin polymers should have a weight-average molecular weight in the range of about 10,000–600,000, preferably about 30,000–500,000, and most desirably about 100,000–450,000, from the standpoint of releasability, weld strength, molding appearance, and flowability.

The amount of the olefin polymer should be in the range of about 0.01–10 pbw, preferably about 0.1–5 pbw, for 100 pbw of the liquid crystalline resin, from the standpoint of releasability and weld strength.

The liquid crystalline resin compound of the invention may optionally be incorporated with an epoxy compound for improvement in its physical properties. The epoxy compound is not specifically restricted in structure; however, it should have two or more epoxy groups, preferably two epoxy groups. Examples of the epoxy compound include glycidyl ether, glycidyl ester ethers, glycidyl esters, epoxidized imide compounds, epoxy group-containing copolymers, and epoxysilanes. They may be used alone or in combination with one another.

The liquid crystalline resin compound of the invention may be incorporated with ordinary additives (exemplified below) and other thermoplastic resins (such as fluoroplastics) so as to give desired properties to it.

Antioxidant and heat stabilizer (such as hindered phenols, hydroquinone, phosphites, and substitution products thereof).

UV light absorber (such as resorcinol, salicylate, benzotriazole, and benzophenone).

Slip agent (such as montanic acid, salt thereof, or ester or half-ester thereof, stearyl alcohol, and stearamide).

Dye (such as nigrosine).

Pigment (such as cadmium sulfide and phthalocyanine).

Nucleating agent.

Plasticizer.

Flame retardant.

Antistatic agent.

The liquid crystalline resin compound of the invention should preferably be prepared by melt-mixing, the method of which is not specifically restricted. Melt-mixing may be accomplished by using a mixing roll, Banbury mixer, kneader, or extruder. An extruder (with one or more screws) is desirable. A twin-screw extruder is most desirable for the effective control of filler's aspect ratio.

The liquid crystalline resin compound of the invention may be molded by ordinary method such as injection molding, extrusion molding, blow molding, and compression molding. Among others injection molding is desirable.

The liquid crystalline resin compound is composed of partially aromatic liquid crystalline polyester resin and wholly aromatic liquid crystalline polyester resin so that the molded product obtained from it has a flexural modulus which is about 15% higher than that which does not contain the second component.

The flexural properties are measured according to ASTM D-790 using a test piece (127 mm long, 12.7 mm wide, and 3.17 mm thick), with a span of 50 mm, under strain at a rate of 1 mm/min.

The liquid crystalline resin compound of the invention is so designed as to give a molded product having a flexural deflection greater than about 3 mm.

Thus, the liquid crystalline resin compound of the invention has good flowability and gives molded products having good mechanical properties, especially balanced rigidity and toughness. It is useful as a molding material for three-dimensional products, sheets, containers, pipes, etc. Examples of molded products are listed below.

Electric and electronic parts (such as gears, casings, boards, sensors, LED lamps, connectors, sockets, resistors, relay casings, switches, coil bobbins, condensers, variable condenser casings, optical pickups, oscillators, terminal boards, transducers, plugs, printed circuit boards, tuners, speakers, microphones, headphones, miniature motors, magnetic head bases, power modules, housings, semiconductors, liquid crystalline display, FDD carriages, FDD chassis, HDD parts, motor brush holders, parabolic antennas, and computer parts).

Parts of such domestic and office electric and electronic machines as TV, VTR, iron, hair dryer, rice cooker, microwave oven, audio, laser disc, compact disc, illuminator, refrigerator, air conditioner, typewriter, word processor, office computer, pocket bell, portable telephone, telephone, facsimile, and duplicator.

Such bearings as oilless bearing, underwater bearing, and aft bearing.

Parts of such machines as motor, lighter, and typewriter.

Parts of such optical instruments and precision machines as microscope, binocular, camera, and watch.

Bases for alternator terminal, alternator connector, IC regulator, light dimmer, potentiometer, etc.

Automotive parts such as valves and pipes (for fuel system, intake gas, and exhaust gas), air intake nozzle snorkel, intake manifold, fuel pump, engine coolant joint, carburetor main body, carburetor spacer, exhaust gas sensor, coolant sensor, oil temperature sensor, brake pad wear sensor, throttle position sensor, crank shaft position sensor, air flowmeter, air conditioner thermostat base, heating warm air flow control valve, radiator motor brush holder, water pump impeller, turbine vane, wiper motor, distributor, starter switch, starter relay, transmission wire harness, window washer nozzle, air conditioner panel switch board, fuel solenoid valve coil, fuse connector, horn terminal insulating board, step motor rotor, lamp socket, lamp reflector, lamp housing, brake piston, solenoid bobbin, engine oil filter, and ignition system casing.

EXAMPLES

The invention will be described in more detail with reference to the following examples, which are not intended to restrict the scope of the invention.

Referential Example 1 (A-1)

A reaction vessel equipped with a stirrer and distillation column was charged with 995 pbw of p-hydroxybenzoic acid, 126 pbw of 4,4'-dihydroxybiphenyl, 112 pbw of terephthalic acid, 216 pbw of polyethylene terephthalate (having an intrinsic viscosity of ca. 0.6 dl/g), and 960 pbw of acetic anhydride. On polymerization, there was obtained a liquid crystalline polyester resin characterized by a phase transition point of 293° C., a logarithmic viscosity number of 1.49 dl/g, and a weight-average molecular weight of ca. 21,000.

Referential Example 2 (A-2)

A reaction vessel equipped with a stirrer and distillation column was charged with 907 pbw of p-hydroxybenzoic acid, 117 pbw of 4,4'-dihydroxybiphenyl, 30 pbw of hydroquinone, 150 pbw of terephthalic acid, 294 pbw of polyethylene terephthalate (having an intrinsic viscosity of ca. 0.6 dl/g), and 940 pbw of acetic anhydride. On polymerization, there was obtained a liquid crystalline polyester resin characterized by a phase transition point of 291° C., a logarithmic viscosity number of 1.28 dl/g, and a weight-average molecular weight of ca. 18,000.

Referential Example 3 (A-3)

A reaction vessel equipped with a stirrer and distillation column was charged with 870 pbw of p-hydroxybenzoic acid, 251 pbw of 4,4'-dihydroxybiphenyl, 149 pbw of hydroquinone, 195 pbw of 2,6-naphthalenedicarboxylic acid, 299 pbw of terephthalic acid, and 1314 pbw of acetic anhydride. On polymerization, there was obtained a liquid crystalline polyester resin characterized by a phase transition point of 317° C., a logarithmic viscosity number of 6.12 dl/g, and a weight-average molecular weight of ca. 30,000.

Referential Example 4 (A-4)

Polycondensation was performed on 1265 pbw of p-acetoxybenzoic acid and 456 pbw of 6-acetoxy-2-naphthoic acid in a reaction vessel equipped with a stirrer and distillation column as disclosed in Japanese Patent Laid-open No. 77691/1979. There was obtained a liquid crystalline polyester resin characterized by a phase transition point of 293° C., a logarithmic viscosity number of 5.24 dl/g, and a weight-average molecular weight of ca. 35,000.

Examples 1 to 11 and Comparative Examples 1 to 10

Each of the liquid crystalline polyester resins obtained in Referential Examples was incorporated (by dry blending) with glass milled fiber (having an average length of 40 μm or 140 μm) or glass fiber (having an average length of 3 mm) in a prescribed amount as shown in Table 1. Each blend underwent melt-mixing at 290°–330° C. by a 30 mm twin-screw extruder, and the resulting melt was pelletized. After hot-air drying, the pellets were injection-molded into test pieces by using an injection molding machine ("Sumitomo Nestaal Promat 40/25" made by Sumitomo Heavy Industries, Ltd.), with the cylinder temperature set at 90° C. The test pieces were used for measurement of characteristic properties as follows.

(1) Flexural properties:

Test pieces measuring 127 mm long, 12.7 mm wide, and 3.17 mm thick were prepared by injection molding, and tested for flexural modulus and flexural deflection according to ASTM D-790.

(2) Flowability:

Test pieces measuring 12.7 mm wide and 0.5 mm thick were prepared by injection molding, with the cylinder temperature set at the melting point plus 10° C., the mold temperature set at 90° C., the injection speed set at 99%, and the injection pressure set at 500 kgf/cm$^2$. Flowability was determined by measuring the length of the test piece obtained.

(3) Fitting test:

This test is intended to estimate the balance between rigidity and toughness. This test employs a test piece consisting of a square box (measuring 80 mm long inside, 50 mm wide inside, 5 mm high inside, and 4 mm thick) and a square plate (measuring 80 mm long, 50 mm wide, and 1 mm thick). The box has paws (0.8 mm thick and 2 mm long) on the upper inside of the longer wall. The plate is pressed into the box. The test piece is rated as good if the plate fits into the box without the paws being broken. The test piece is rated as poor if the plate does not fit into the box although the paws remain unbroken. The test piece is rated as bad if the paws are broken. The test results are shown in Table 1 below.

posed of a partially aromatic liquid crystalline polyester resin and a wholly aromatic liquid crystalline polyester resin in a specific ratio and it is incorporated with a filler having a specific aspect ratio.

Example 12

Example 8 was repeated except that the resin compound (100 pbw) was incorporated with an organic bromine compound (6 pbw) specified below.

Designation: FR-1

Description: Brominated polystyrene (containing 59% Br) obtained by polymerization from dibrominated styrene (80 wt %), monobrominated styrene (15 wt %), and tribrominated styrene (5 wt %), with a weight-average molecular weight of 30×10$^4$. The resulting pellets were injection-molded into test pieces (127 mm long, 12.7 mm wide, 0.5 mm thick) by using an injection molding machine ("Sumitomo Nestaal Promat 40/25" made by Sumitomo Heavy Industries, Ltd.), with the cylinder temperature set at the melting point plus 10° C. and the mold temperature set at 90° C. The test pieces were used for evaluation of flame retardance by the vertical flame test according to the UL-94 standard. The results are shown in Table 2.

It is apparent from Table 2 that the liquid crystalline resin compound acquires flame retardance without sacrificing its flowability and mechanical properties.

TABLE 1

| | | Partially aromatic liquid crystalline polyester | | Wholly aromatic liquid crystalline polyester | | Glass fiber* | | | Flexural properties | | Flowability | |
|---|---|---|---|---|---|---|---|---|---|---|---|---|
| | | Kind | Amount (wt %) | Kind | Amount (wt %) | Amount (pbw) | Fiber length (μm) | Aspect ratio | Elastic modulus (GPa) | Deflection (mm) | Flow length (mm) | Fitting test |
| Example | 1 | A-1 | 80 | A-3 | 20 | 45 | 80 | 9.0 | 14 | 4.4 | 157 | good |
| | 2 | A-1 | 62 | A-3 | 38 | 45 | 60 | 8.6 | 13 | 4.9 | 153 | good |
| | 3 | A-1 | 85 | A-4 | 15 | 45 | 60 | 6.7 | 13 | 4.4 | 157 | good |
| | 4 | A-1 | 85 | A-4 | 15 | 45 | 60 | 6.7 | 14 | 5.2 | 157 | good |
| | 5 | A-1 | 60 | A-4 | 40 | 45 | 45 | 7.5 | 13 | 5.6 | 155 | good |
| | 6 | A-2 | 70 | A-3 | 30 | 45 | 100 | 11.0 | 14 | 4.5 | 155 | good |
| | 7 | A-2 | 75 | A-3 | 25 | 45 | 90 | 10.0 | 13 | 4.4 | 156 | good |
| | 8 | A-2 | 65 | A-4 | 35 | 45 | 60 | 7.5 | 13 | 5.2 | 155 | good |
| | 9 | A-2 | 85 | A-4 | 15 | 45 | 60 | 7.5 | 14 | 4.5 | 157 | good |
| | 10 | A-1 | 80 | A-4 | 20 | 45 | 38 | 4.0 | 12 | 5.4 | 160 | good |
| | 11 | A-1 | 70 | A-4 | 30 | 45 | 150 | 23.0 | 14 | 3.9 | 151 | good |
| Comparative Example | 1 | A-1 | 100 | | | 45 | 60 | 8.6 | 10 | 3.4 | 156 | poor |
| | 2 | A-2 | 100 | | | 45 | 60 | 8.6 | 10 | 3.6 | 158 | poor |
| | 3 | | | A-3 | 100 | 45 | 60 | 8.6 | 10 | 3.5 | 125 | poor |
| | 4 | | | A-4 | 100 | 45 | 60 | 8.6 | 9 | 3.8 | 128 | poor |
| | 5 | A-1 | 80 | A-3 | 20 | 250 | 60 | 8.6 | 12 | 2.9 | 94 | bad |
| | 6 | A-1 | 40 | A-3 | 60 | 45 | 60 | 8.6 | 10 | 4.0 | 133 | poor |
| | 7 | A-2 | 85 | A-4 | 15 | 45 | 320 | 35.6 | 12 | 2.6 | 126 | bad |
| | 8 | A-2 | 85 | A-4 | 15 | 45 | 15 | 1.7 | 11 | 3.9 | 159 | poor |
| | 9 | A-1 | 40 | A-3 | 60 | 250 | 60 | 8.6 | 11 | 2.6 | 86 | bad |
| | 10 | A-1 | 40 | A-3 | 60 | 45 | 320 | 8.6 | 13 | 2.8 | 08 | bad |

Remarks: *Values in the resin compound
The glass fiber used in Example 4 is identical with that used in Example 3 except for surface treatment with epoxysilane.

It is apparent from Table 1 that the liquid crystalline resin compound has good flowability and gives molded products having balanced rigidity and toughness only if it is com-

TABLE 2

| | Partially aromatic liquid crystalline polyester | | Wholly aromatic liquid crystalline polyester | | Glass fiber* | | | Organic bromine compound | | Flexural properties | | Flowa-bility | | |
|---|---|---|---|---|---|---|---|---|---|---|---|---|---|---|
| | | | | | Fiber | | | | | Elastic | Deflec- | Flow | | Flam- |
| | Kind | Amount (wt %) | Kind | Amount (wt %) | Amount (pbw) | length (μm) | Aspect ratio | Kind | Amount (pbw) | modulus (GPa) | tion (mm) | length (mm) | Fitting test | mability UL-94 |
| Example 12 | A-2 | 65 | A-4 | 35 | 45 | 60 | 7.5 | FR-1 | 6 | 13 | 5.1 | 151 | good | V-0 |

Remarks: *Values in the resin compound

Examples 13 to 17

Example 8 was repeated except that the resin compound (100 pbw) was incorporated with an olefin polymer specified in Table 3. The resulting pellets were injection-molded into test pieces by using an injection molding machine ("Toshiba IS55EPN" made by Toshiba Kikai Plastic Engineering Co., Ltd.), with the cylinder temperature set at the melting point plus 10° C. and the mold temperature set at 90° C. The test piece was in the form of box measuring 100 mm long, 8 mm wide, 10 mm high, and 1 mm thick wall, and having four partition walls (0.8 mm thick) at equal intervals. In the molding operation, force required for ejection was measured to evaluate the releasability of the resin compound. In addition, the test piece was examined for appearance (burn marks). The results are shown in Table 3.

It is apparent from Table 3 that the liquid crystalline resin compound acquires good releasability without sacrificing its flowability and mechanical properties and the surface appearance of its molded products.

said partially aromatic liquid crystalline polyester resin (a) is a copolymer composed of all of the following structural units (I), (II), (III), and (IV)

  (I)

  (II)

  (III)

  (IV)

where $R_1$ denotes one or more than one group selected from the group consisting of

TABLE 3

| Example | Partially aromatic liquid crystalline polyester | | Wholly aromatic liquid crystalline polyester | | Glass fiber* | | | Olefin polymer | | | Flexural Properties | | Flow-ability | | Releas-ability | |
|---|---|---|---|---|---|---|---|---|---|---|---|---|---|---|---|---|
| | | | | | | | | | | | Elastic | Deflec- | Flow | Fit- | Ejection | Burn |
| | Kind | Amount (wt %) | Kind | Amount (wt %) | Amount (pbw) | Length (μm) | Aspect ratio | Kind | M.W. ($M_W$) | Amount | modulus (GPa) | tion (mm) | length (mm) | ting test | force (kg) | marks |
| 13 | A-2 | 65 | A-4 | 35 | 45 | 60 | 7.5 | PE | 400,000 | 0.4 | 13 | 5.1 | 153 | good | 30 | none |
| 14 | A-2 | 65 | A-4 | 35 | 45 | 60 | 7.5 | PP | 150,000 | 0.4 | 13 | 5.0 | 153 | good | 32 | none |
| 15 | A-2 | 65 | A-4 | 35 | 45 | 60 | 7.5 | PE/P | 100,000 | 0.4 | 13 | 5.1 | 154 | good | 33 | none |
| 16 | A-2 | 65 | A-4 | 35 | 45 | 60 | 7.5 | PE/B1 | 110,000 | 0.4 | 13 | 5.0 | 154 | good | 32 | none |
| 17 | A-2 | 65 | A-4 | 35 | 45 | 60 | 7.5 | PE/P/HD | 80,000 | 0.4 | 13 | 5.1 | 155 | good | 35 | none |
| 8 | A-2 | 65 | A-4 | 35 | 45 | 60 | 7.5 | — | — | — | 13 | 5.2 | 155 | good | >180 | none |

Remarks: *Values in the resin compound.
PE: Polyethylene
PP: Polypropylene
PE/P: Ethylene/propylene copolymer
PE/B1: Ethylene/butene-1 copolymer
PE/P/HD: Ethylene/propylene/1,4-hexadiene copolymer

What is claimed is:

1. A liquid crystalline resin compound which comprises about 100 pbw of liquid crystalline resin and about 5–200 pbw of inorganic filler, said liquid crystalline resin being composed of both of about (a) 99.5–50 wt % of partially aromatic liquid crystalline polyester resin having an aliphatic chain and (b) about 0.5–50 wt % of wholly aromatic liquid crystalline polyester resin, based on the weight of said liquid crystalline resin, and said inorganic filler having an average aspect ratio in the range of about 3 to 25, wherein

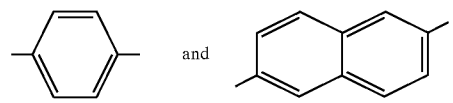 and 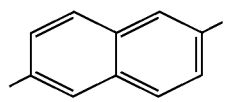

$R_2$ denotes one or more than one group selected from the group consisting of

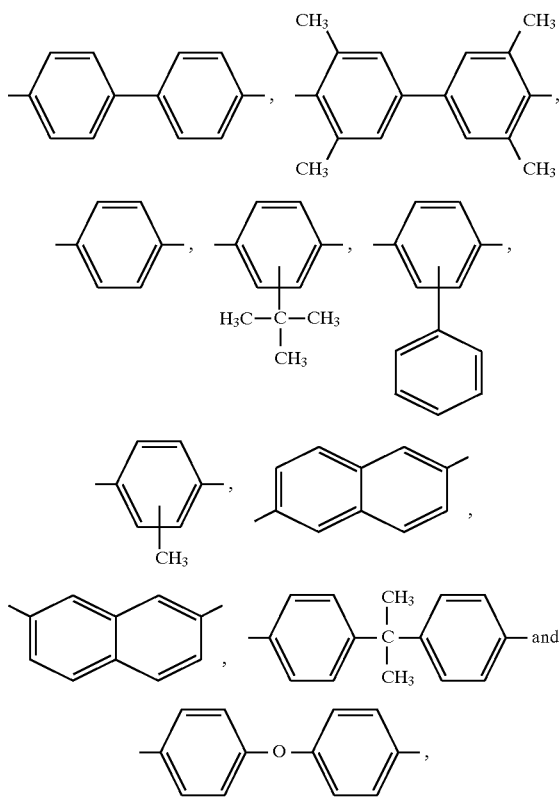

R₃ denotes one or more than one group selected from the group consisting of

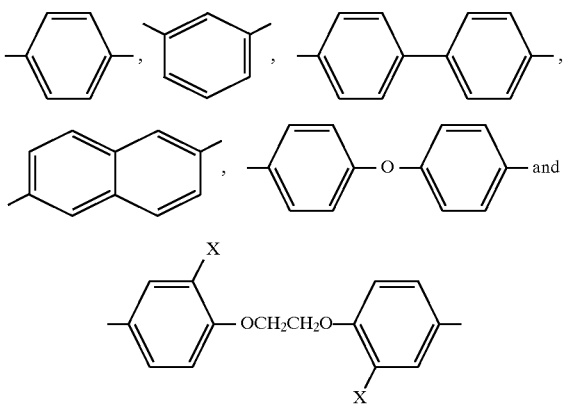

and X denotes hydrogen or chlorine, and the total amount of the structural units (II) and (III) is substantially equimolar with the amount of the structural unit (IV).

2. The liquid crystalline resin compound as defined in claim 1, wherein the partially aromatic liquid crystalline polyester resin accounts for about 95-55 wt % of said liquid crystalline resin and the wholly aromatic liquid crystalline polyester resin accounts for about 5–45 wt % of said liquid crystalline resin.

3. The liquid crystalline resin compound as defined in claim 1, which is characterized by having a flexural modulus (measured according to ASTM D-790, ⅛-inch thick) which is about 15% higher than a resin compound composed solely of said partially aromatic liquid crystalline polyester resin.

4. The liquid crystalline resin compound as defined in claim 1, which is characterized by having a flexural deflection (measured according to ASTM D-790, ⅛-inch thick) greater than about 3 mm.

5. The liquid crystalline resin compound as defined in claim 1, wherein the wholly aromatic liquid crystalline polyester resin has a weight-average molecular weight in the range of about 10,000 to 200,000.

6. The liquid crystalline resin compound as defined claim 1, wherein the partially aromatic liquid crystalline polyester resin has a weight-average molecular weight in the range of about 10,000 to 200,000.

7. The liquid crystalline resin compound as defined in claim 1, wherein the partially aromatic liquid crystalline polyester resin is composed of said structural units (I), (II), (III), and (IV), with the total amount of (I) and (II) being about 60–95 mol % of the total amount of (I), (II), and (III), the amount of (III) being about 40-5 mol % of the total amount of (I), (II), and (III), the molar ratio of (I)/(II) being from about 75/25 to 95/5, and the amount of (IV) being substantially equimolar with the total amount of (II) and (III).

8. The liquid crystalline resin compound as defined in claim 1, wherein more than about 50% of the inorganic filler is in the form of fiber.

9. The liquid crystalline resin compound as defined in claim 1, wherein the inorganic filler is selected from the group consisting of fibers, particles and plates.

10. The liquid crystalline resin compound as defined in claim 1, wherein more than about 50% of the inorganic filler is glass fiber.

11. The liquid crystalline resin compound as defined in claim 1, wherein the inorganic filler is glass fiber.

12. The liquid crystalline resin compound as defined in claim 8, wherein the fibrous filler has a weight mean length smaller than about 0.3 mm.

13. The liquid crystalline resin compound as defined in claim 8, wherein the fibrous filler has a weight mean length smaller than about 0.15 mm.

14. The liquid crystalline resin compound as defined in claim 8, wherein the fibrous filler is one which has undergone surface treatment with a silane coupling agent.

15. The liquid crystalline resin compound as defined in claim 1, which further comprises about 0.5 to 60 pbw of organic bromine compound based on 100 pbw of the liquid crystalline resin.

16. The liquid crystalline resin compound as defined in claim 15, wherein the organic bromine compound is brominated polystyrene formed from brominated styrene monomer and having a weight-average molecular weight from about $1 \times 10^3$ to $120 \times 10^4$ which is composed mainly of at least one of the following structural units:

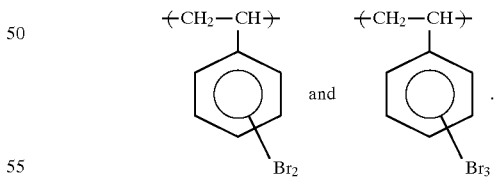

17. A molded article of liquid crystalline resin as defined in claim 1 which is obtained by molding from said liquid crystalline resin compound comprising about 100 pbw of said liquid crystalline resin and about 5–200 pbw of inorganic filler, said liquid crystalline resin being composed of about 99.5-50 wt % of said partially aromatic liquid crystalline polyester resin and about 0.5–50 wt % of said wholly aromatic liquid crystalline polyester resin, based on the weight of said liquid crystalline resin, and said inorganic filler having an average aspect ratio in the range of about 3 to 25.

18. The molded article of liquid crystalline resin as defined in claim 17, which molded article is characterized by having partly thin walls.

19. The liquid crystalline resin as defined in claim 1, wherein said inorganic filler comprises fibers and said average aspect ratio is determined by dividing the mean fiber length of said fibers by the average diameter of said fibers.

20. The liquid crystalline resin as defined in claim 1, wherein said inorganic filler comprises plates or particles, each filler having a thickness and a major axis, and wherein said average aspect ratio is defined as the ratio between the average major axis and the average thickness of said fillers.

21. A liquid crystalline resin compound comprising:

100 pbw liquid crystalline resin (A) and 5–200 pbw inorganic filler (B), said liquid crystalline resin (A) comprising (a) about 99.5-50 wt % partially aromatic liquid crystalline polyester resin (i), said partially aromatic liquid crystalline polyester resin (i) comprising a copolymer of ‡O—CH$_2$CH$_2$—O‡, ‡O—R$_1$—CO‡, ‡O—R$_2$—O‡ and ‡OC—R$_3$—CO‡, wherein R$_1$ denotes one or more than one group selected from the group consisting of

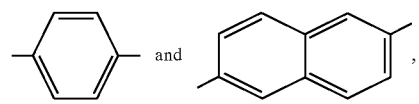

R$_2$ denotes one or more than one group selected from the group consisting of

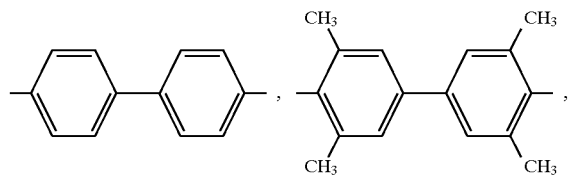

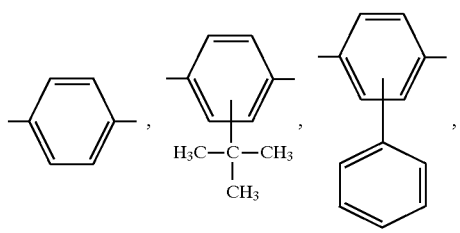

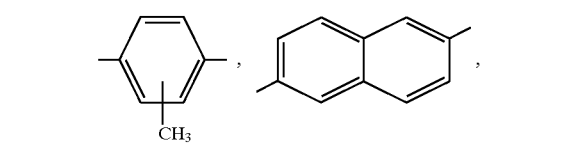

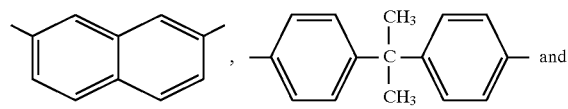

-continued

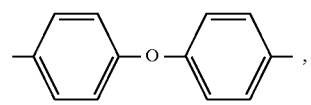

R$_3$ denotes one or more than one group selected from the group consisting of

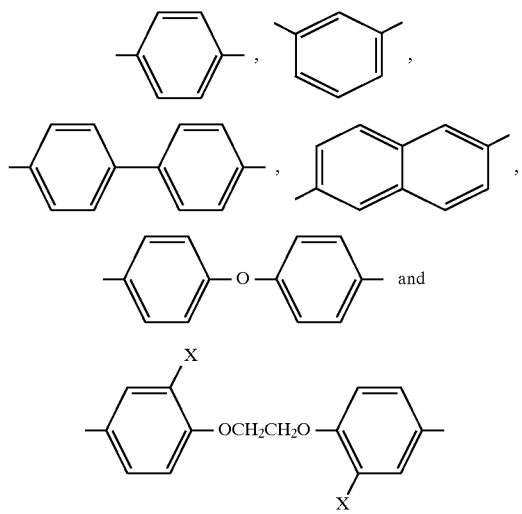

and (b) about 0.5–50 wt % of wholly aromatic liquid crystalline polyester resin (ii), said wholly aromatic liquid crystalline polyester resin (ii) comprising a copolymer of ‡O—R$_1$—CO‡ and/or a copolymer of ‡O—R$_1$—CO‡, ‡O—R$_2$—O‡ and ‡OC—R$_3$—CO‡, wherein R$_1$, R$_2$ and R$_3$ are the same as defined above, said inorganic filler being selected from the group consisting of fibers, plates and particles, said inorganic filler having an average aspect ratio determined by dividing the mean fiber length of said fibers by the average diameter of said fibers when said inorganic filler comprises fibers, and said average aspect ratio being defined as the ratio between the average major axis and the average thickness of said fillers when said inorganic filler comprises plates or particles, said average aspect ratio being in the range of about 3 to 25.

22. The liquid crystalline resin compound as defined in claim 1, which further comprises about 0.01 to 10 pbw of olefin polymer based on 100 pbw of the liquid crystalline resin, said olefin polymer being at least one selected from the group consisting of polyethylene, polypropylene, copolymer of ethylene or propylene with α-olefin having 3 or more carbon atoms and copolymer of ethylene or propylene with α-olefin having 3 or more carbon atoms and non-conjugated diene, and having a weight-average molecular weight in the range of about 10,000 to 600,000.

* * * * *